United States Patent
Do et al.

(10) Patent No.: US 9,725,531 B2
(45) Date of Patent: Aug. 8, 2017

(54) CATALYST COMPOSITION, A METHOD FOR PREPARING THE SAME, AND A METHOD FOR PREPARING POLYOLEFIN USING THE SAME

(71) Applicant: LG CHEM, LTD., Seoul (KR)

(72) Inventors: Young Shil Do, Daejeon (KR); Choong Hoon Lee, Daejeon (KR); Seung Hwan Jung, Daejeon (KR); Don Ho Kum, Daejeon (KR); Sang Eun Park, Daejeon (KR); Hae Woong Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/895,763

(22) PCT Filed: Dec. 27, 2013

(86) PCT No.: PCT/KR2013/012315
§ 371 (c)(1),
(2) Date: Dec. 3, 2015

(87) PCT Pub. No.: WO2014/208851
PCT Pub. Date: Dec. 31, 2014

(65) Prior Publication Data
US 2016/0130372 A1    May 12, 2016

(30) Foreign Application Priority Data

Jun. 25, 2013  (KR) .................. 10-2013-0073044
Dec. 27, 2013  (KR) .................. 10-2013-0165070

(51) Int. Cl.
| | | |
|---|---|---|
| C07F 17/00 | (2006.01) | |
| C08F 4/6592 | (2006.01) | |
| C08F 10/00 | (2006.01) | |
| C08F 4/659 | (2006.01) | |

(52) U.S. Cl.
CPC ........ *C08F 4/65925* (2013.01); *C08F 4/6592* (2013.01); *C08F 4/65908* (2013.01); *C08F 10/00* (2013.01); *C08F 2410/03* (2013.01)

(58) Field of Classification Search
CPC .... C07F 17/00; C08F 4/9562; C08F 4/65908; C08F 4/65927; C08F 10/00
See application file for complete search history.

(56) References Cited

U.S. PATENT DOCUMENTS

| | | |
|---|---|---|
| 5,032,562 A | 7/1991 | Lo et al. |
| 6,153,776 A | 11/2000 | Patton et al. |
| 6,288,254 B1 | 9/2001 | Chen et al. |
| 7,928,256 B2 | 4/2011 | Lee et al. |
| 8,039,671 B2 | 10/2011 | Lee et al. |
| 8,048,973 B2 | 11/2011 | Lee et al. |

FOREIGN PATENT DOCUMENTS

| | | |
|---|---|---|
| CN | 101213218 A | 7/2008 |
| EP | 0994132 A1 | 4/2000 |
| JP | 2000169492 A | 6/2000 |
| KR | 10-2000-0025587 A | 5/2000 |
| KR | 10-2004-0076965 A | 9/2004 |
| KR | 10-2007-0079254 A | 8/2007 |
| KR | 10-2007-0096465 A | 10/2007 |
| KR | 10-2008-0076187 A | 8/2008 |
| KR | 10-2008-0104562 A | 12/2008 |
| KR | 10-2009-0063799 A | 6/2009 |
| KR | 10-2010-0067627 A | 6/2010 |
| KR | 10-2012-0028269 A | 3/2012 |
| KR | 10-2012-0029162 A | 3/2012 |
| KR | 10-2015-0000812 A | 1/2015 |
| WO | 2014/208852 A1 | 12/2014 |

OTHER PUBLICATIONS

Gurubasavaraj et al., "Oxygen Effect in Heterobimetallic Catalysis: The Zr—O—Ti System as an Excellent Example for Olefin Polymerization", Organometallics, 2007, vol. 26, pp. 3346-3351.
Lee et al., "Biphenylene-Bridged Dinuclear Group 4 Metal Complexes: Enhanced Polymerization Properties in Olefin Polymerization", Organometallics, 2005, vol. 24, pp. 3618-3620.
Lin et al., "Ethylene polymerization by 3-oxy-pentamethylene bridged dinuclear metallocene (Ti,Zr)/MAO systems", European Polymer Journal, 2007, vol. 43, pp. 1436-1443.
Mandal et al., "Oxygen-Bridged Hybrid Metallocene-Nonmetallocene Polymetallic Catalysts of Group 4 Metals for Bimodal Activity in Olefin Polymerization: Synthesis, Characterization, and Theoretical Investigation", Inorganic Chemistry, 2007, vol. 46, pp. 10158-10167.
Schilling et al., "Dinuclear metallocene complexes as catalyst precursors for homogeneous ethylene polymerazation", Applied Catalyst A: General 348, 2008, pp. 79-85.

*Primary Examiner* — Caixia Lu
(74) *Attorney, Agent, or Firm* — Dentons US LLP

(57) ABSTRACT

This disclosure relates to a catalyst composition that can prepare polyolefin having high molecular weight, a method for preparing the same, and a method for preparing polyolefin using the same. The dinuclear metallocene compound included in the catalyst composition according to the present invention is a dinuclear metallocene compound with a new structure, and, unlike a single-site catalyst, has high accessibility to a substrate, and thus, can provide a multi-site catalyst with high activity.

9 Claims, No Drawings

CATALYST COMPOSITION, A METHOD FOR PREPARING THE SAME, AND A METHOD FOR PREPARING POLYOLEFIN USING THE SAME

CROSS-REFERENCE

This application is a National Stage Application of International Application No. PCT/KR2013/012315, filed Dec. 27, 2013, and claims priority to and the benefit of Korean Patent Application No. 10-2013-0073044, filed on Jun. 25, 2013, and Korean Patent Application No. 10-2013-0165070, filed Dec. 27, 2013, the contents of which are incorporated by reference in its entirety for all purposes as if fully set forth below.

BACKGROUND OF THE INVENTION (a) Field of the Invention

The present invention relates to a catalyst composition, and a method for preparing the same, and a method for preparing polyolefin using the same. More specifically, the present invention relates to a catalyst composition comprising a dinuclear metallocene compound with a novel structure, which can prepare polyolefin with high molecular weight, a method for preparing the same, and a method for preparing polyolefin using the same.

(b) Description of the Related Art

Since a Zeigler-Natta catalyst widely applied in an industrial process is a multi-site catalyst, the molecular weight distribution of the produced polymer is wide, and the composition distribution of comonomers is not uniform, and thus, has a limitation in securing desired properties.

Meanwhile, a metallocene catalyst is a single-site catalyst having one kind of an active site, and it has advantages in that the molecular weight distribution of the produced polymer is narrow, and that the molecular weight, stereoregularity, crystallinity, particularly reactivity of comonomers may be greatly controlled according to the structure of the catalyst and the ligand. However, polyolefin polymerized using a metallocene catalyst has narrow molecular weight distribution, and if applied for some products, productivity is remarkably decreased due to extrusion load and the like, rendering site application difficult, and thus, there have been many attempts to control the molecular weight distribution of polyolefin For this, a method of using a mononuclear metallocene compound and a dinuclear metallocene compound is known.

As an example of the mononuclear metallocene compound, U.S. Pat. No. 5,032,562 describes a method of preparing a polymerization catalyst by supporting two different transition metal catalysts on one carrier. This is a method of producing bimodal distribution polymer by supporting a titanium (Ti)-based Ziegler Natta catalyst producing high molecular weight and a zirconium (Zr)-based metallocene catalyst producing low molecular weight on one carrier, however, it has disadvantages in that the supporting process is complicated, and the morphology of polymer becomes worse due to a cocatalyst.

And, studies on changing copolymer selectivity and activity of a catalyst in copolymerization using a dinuclear metallocene compound has been reported, and in case of some metallocene catalysts, copolymer incorporation and activity increase have been reported.

For example, Korean Patent Application No. 2003-12308 discloses a method of controlling molecular weight distribution by supporting a dinuclear metallocene catalyst and a mononuclear metallocene catalyst on a carrier together with an activator and polymerizing while changing the combination of catalysts in the reactor. However, this method has a limitation in simultaneously realizing the properties of each catalyst, and has a disadvantage in that a metallocene catalyst part is dissociated in the carrier component of the final catalyst, thus causing fouling of a reactor.

And, a synthesis method of a Group 4 metallocene catalyst having a biphenylene bridge and polymerization of ethylene and styrene using the same have been reported (Organometallics, 2005, 24, 3618). According to this method, it is stated that the catalytic activity is high and the molecular weight of the obtained polymer is high, compared to a mononuclear metallocene catalyst. It has been also reported that the reactivity of a catalyst may be changed by converting the bridge structure of Group 4 dinuclear metallocene catalyst (Eur. Polym, J. 2007, 43, 1436).

However, if using these methods, previously reported Group 4 metallocene catalyst having a biphenylene bridge has problems in terms of addition of substituents and modification of a structure. Therefore, there is a need for development of novel metallocene catalyst useful for preparation of olefin.

SUMMARY OF THE INVENTION

In order to solve the problems, it is an object of the invention to provide a catalyst composition comprising a novel dinuclear metallocene compound, which can prepare polyolefin having high molecular weight with high activity.

It is another object of the invention to provide a method for preparing the catalyst composition.

It is still another object of the invention to provide a method for preparing polyolefin using the catalyst composition.

One aspect of the invention provides a catalyst composition comprising a dinuclear metallocene compound represented by the following Chemical Formula 1; and at least one cocatalyst compound selected from the group consisting of a compound represented by the following Chemical Formula 2, a compound represented by the following Chemical Formula 3, and a compound represented by the following Chemical Formula 4:

[Chemical Formula 1]

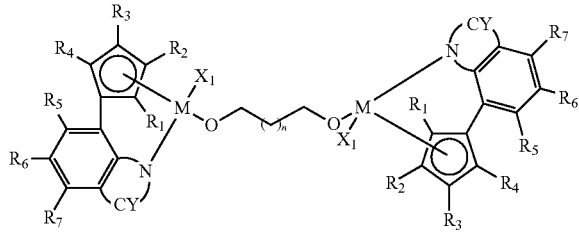

in the Chemical Formula 1, $R_1$ to $R_4$ may be identical to or different from each other, and are independently hydrogen; a halogen radical; an alkyl radical having a carbon number of 1 to 20; an alkenyl radical having a carbon number of 2 to 20; a silyl radical; an aryl radical having a carbon number of 6 to 20; an alkylaryl radical having a carbon number of 7 to 20; or an arylalkyl radical having a carbon number of 7 to 20; and two or more adjacent radicals of $R_1$ to $R_4$ may be linked each other to form an aliphatic ring, or an aromatic ring;

$R_5$ to $R_7$ may be identical to or different from each other, and are independently hydrogen; a halogen radical; an alkyl radical having a carbon number of 1 to 20; an alkenyl radical having a carbon number of 2 to 20; an aryl radical having a carbon number of 6 to 20; an alkylaryl radical having a carbon number of 7 to 20; an arylalkyl radical having a carbon number of 7 to 20; an alkoxy radical having a carbon number of 1 to 20; an aryloxy radical having a carbon number of 6 to 20; or an amido radical; and two or more adjacent radicals of R5 to R7 may be linked each other to form an aliphatic ring, or an aromatic ring;

CY is an aliphatic or aromatic ring containing nitrogen, and may be unsubstituted or substituted with halogen, an alkyl or aryl radical having a carbon number of 1 to 20, and if it has multiple substituents, two or more substituents may be linked each other to form an aliphatic or aromatic ring;

M is Group 4 transition metal;

X1 is a halogen radical; an alkyl radical having a carbon number of 1 to 20; an alkenyl radical having a carbon number of 2 to 20; an aryl radical having a carbon number of 6 to 20; an alkylaryl radical having a carbon number of 7 to 20; an arylalkyl radical having a carbon number of 7 to 20; an alkylamido radical having a carbon number of 1 to 20; an arylamido radical having a carbon number of 6 to 20; or an alkylidene radical having a carbon number of 1 to 20; and n is an integer of 0 to 10.

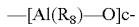  [Chemical Formula 2]

in the Chemical Formula 2, $R_8$ is a halogen radical, a hydrocarbyl radical having a carbon number of 1 to 20, or a hydrocarbyl radical having a carbon number of 1 to 20, substituted with halogen, and c is an integer equal to or greater than 2,

  [Chemical Formula 3]

in the Chemical Formula 3,

D is aluminum or boron, $R_9$ is hydrocarbyl having a carbon number of 1 to 20 or hydrocarbyl having a carbon number of 1 to 20 substituted with halogen,

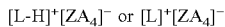  [Chemical Formula 4]

in the Chemical Formula 4,

L is neutral or cationic Lewis acid, H is a hydrogen atom, Z is a Group 13 atom, A's may be identical to or different from each other, and are independently an aryl group having 6 to 20 carbon atoms, or an alkyl group having 1 to 20 carbon atoms, where one or more hydrogen atoms are unsubstituted or substituted with halogen, a hydrocarbon having a carbon number of 1 to 20, alkoxy or phenoxy.

The present invention also provides a method for preparing a catalyst composition comprising the steps of contacting a dinuclear metallocene compound represented by the Chemical Formula 1 with a compound represented by the Chemical Formula 2 and/or a compound represented by the Chemical Formula 3 to obtain a mixture; and adding a compound represented by the Chemical Formula 4 to the mixture.

The present invention also provides a method for preparing polyolefin, comprising the step of polymerizing at least one kind of olefin monomers, in the presence of the catalyst composition.

The dinuclear metallocene compound included in the catalyst composition according to the present invention is a dinuclear metallocene compound with a novel structure, and, unlike a single-site catalyst, has high accessibility to a substrate, and thus, can provide a multi-site catalyst with high activity.

And, using the catalyst composition of the present invention, polyolefin having high molecular weight can be produced.

DETAILED DESCRIPTION OF THE EMBODIMENTS

As used herein, terms "a first", "a second" and the like are used to explain various constructional elements, and they are used only to distinguish one constructional element from other constructional elements.

And, the terms used herein are only to explain illustrative examples, and are not intended to limit the invention. A singular expression includes a plural expression thereof, unless it is expressly stated or obvious from the context that such is not intended. As used herein, the terms "comprise", "contain" or "have" and the like are intended to designate the existence of practiced characteristic, number, step, constructional element or combinations thereof, and they are not intended to preclude the possibility of existence or addition of one or more other characteristics, numbers, steps, constructional elements or combinations thereof.

And, in case it is stated that each constructional element is formed "on" or "above" each construction element, it means that each constructional element is formed directly on each constructional element, or that other constructional elements may be additionally formed between the layers or on the object or substrate.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, the present invention will be explained in detail.

According to one embodiment of the invention, the catalyst composition of the present invention comprises a dinuclear metallocene compound represented by the following Chemical Formula 1.

[Chemical Formula 1]

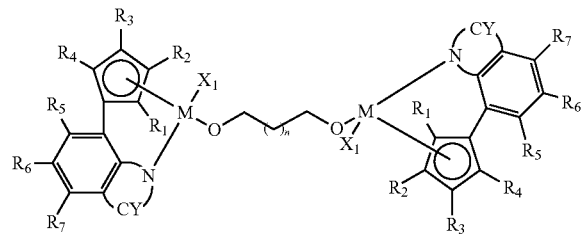

in the Chemical Formula 1,

R1 to R4 may be identical to or different from each other, and are independently hydrogen; a halogen radical; an alkyl radical having a carbon number of 1 to 20; an alkenyl radical having a carbon number of 2 to 20; a silyl radical; an aryl radical having a carbon number of 6 to 20; an alkylaryl radical having a carbon number of 7 to 20; or an arylalkyl radical having a carbon number of 7 to 20; and two or more adjacent radicals of R1 to R4 may be linked each other to form an aliphatic ring, or an aromatic ring;

R5 to R7 may be identical to or different from each other, and are independently hydrogen; a halogen radical; an alkyl radical having a carbon number of 1 to 20; an alkenyl radical having a carbon number of 2 to 20; an aryl radical having a carbon number of 6 to 20; an alkylaryl radical having a carbon number of 7 to 20; an arylalkyl radical having a carbon number of 7 to 20; an alkoxy radical having a carbon number of 1 to 20; an aryloxy radical having a carbon number of 6 to 20; or an amido radical; and two or more adjacent radicals of R5 to R7 may be linked each other to form an aliphatic ring, or an aromatic ring;

CY is an aliphatic or aromatic ring containing nitrogen, and may be unsubstituted or substituted with halogen, an alkyl or aryl radical having a carbon number of 1 to 20, and if it has multiple substituents, two or more substituents may be linked each other to form an aliphatic or aromatic ring;

M is Group 4 transition metal;

X1 is a halogen radical; an alkyl radical having a carbon number of 1 to 20; an alkenyl radical having a carbon number of 2 to 20; an aryl radical having a carbon number of 6 to 20; an alkylaryl radical having a carbon number of 7 to 20; an arylalkyl radical having a carbon number of 7 to 20; an alkylamido radical having a carbon number of 1 to 20; an arylamido radical having a carbon number of 6 to 20; or an alkylidene radical having a carbon number of 1 to 20; and n is an integer of 0 to 10.

According to one embodiment of the invention, in the dinuclear metallocene compound of the Chemical Formula 1, R1 to R7 are independently hydrogen, an alkyl group having a carbon number of 1 to 20, or an aryl group having a carbon number of 6 to 20, or two or more adjacent radicals of R1 to R7 may be linked each other to form one or more aliphatic ring, or aromatic ring, but the present invention is not limited thereto.

And, CY may be a pentagonal or hexagonal aliphatic or aromatic ring containing nitrogen, unsubstituted or substituted with an alkyl group having a carbon number of 1 to 20, but the present invention is not limited thereto.

And, M may be titanium (Ti), zirconium (Zr), or hafnium (Hf), and X1 may be halogen or an alkyl group having a carbon number of 1 to 20, but the present invention is not limited thereto.

Examples of the dinuclear metallocene compound represented by the Chemical Formula 1 include the following compounds, but are not limited thereto.

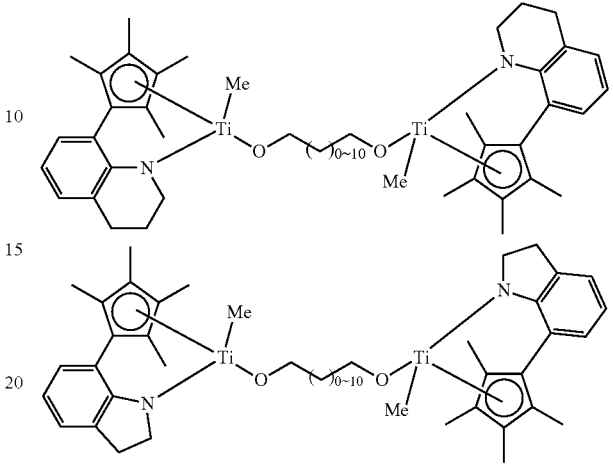

The dinuclear metallocene compound represented by the Chemical Formula 1 may be synthesized, for example, by mixing a metallocene compound with a diol compound, as shown in the following Equation, and then, stirring for a certain time, but is not limited thereto.

The method for preparing a dinuclear metallocene compound represented by the Chemical Formula 1 will be illustrated and explained in detail in the examples below.

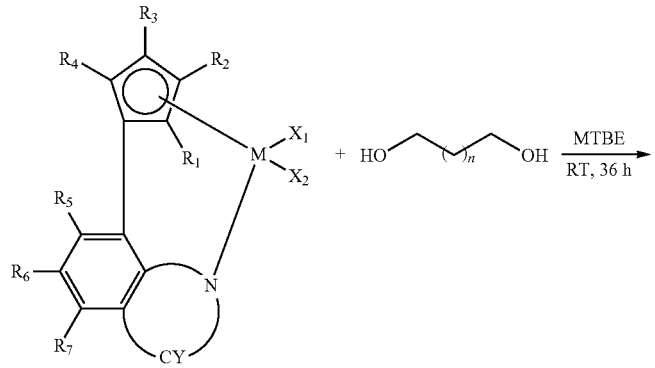

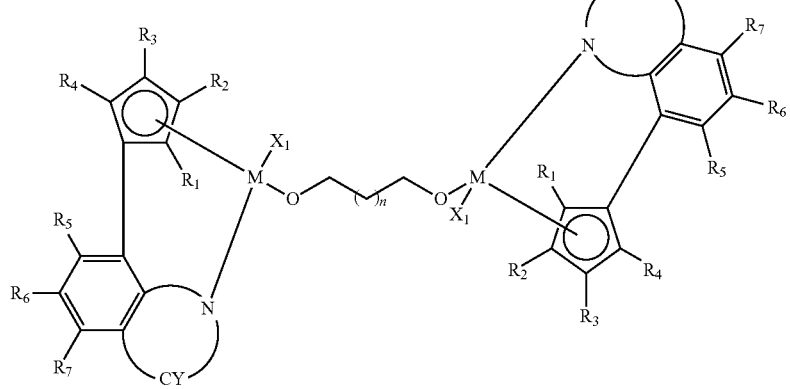

The dinuclear metallocene compound represented by the Chemical Formula 1 includes a structure wherein two single metallocene compounds respectively bridged with a phenylene group having a cyclic amido group introduced therein are crosslinked by alkylenedioxy (—O—(CH$_2$)—(CH$_2$)n-(CH$_2$)—O—). Thus, two metal centers are connected by a diether chain functioning as a linker, to reduce unnecessary interactions between the metals, thus affording stable catalytic activity and easiness of structural deformation, and unlike a single-site catalyst, the compound has high accessibility to a substrate and thus exhibits high activity. Thus, by using the dinuclear metallocene compound as a catalyst for polymerization or copolymerization of polyolefin, polyolefin having high molecular weight and wide molecular weight distribution can be produced with high activity. And, various substituents may be introduced into the cyclopentadienyl and the cyclic amido ring such as quinoline or indoline, which ultimately enables easy controlling of electronic, steric environment around the metals. Namely, by using the compound with the above structure, the structure and the properties and the like of prepared olefin polymer may be easily controlled.

The dinuclear metallocene compound represented by the Chemical Formula 1 may be used to prepare polyolefin polymer, and particularly, it may produce polyolefin having high molecular weight with high activity.

The catalyst composition according to the present invention may further comprise at least one cocatalyst compound selected from the group consisting of a compound represented by the following Chemical Formula 2, a compound represented by the following Chemical Formula 3, and a compound represented by the following Chemical Formula 4, in addition to the dinuclear metallocene compound of the Chemical Formula 1.

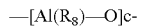   [Chemical Formula 2]

in the Chemical Formula 2,

R$_8$ is a halogen radical, a hydrocarbyl radical having a carbon number of 1 to 20, or a hydrocarbyl radical having a carbon number of 1 to 20 substituted with halogen, and c is an integer equal to or greater than 2,

   [Chemical Formula 3]

in the Chemical Formula 3,

D is aluminum or boron, R$_9$ is hydrocarbyl having a carbon number of 1 to 20 or hydrocarbyl having a carbon number of 1 to 20 substituted with halogen,

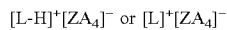   [Chemical Formula 4]

in the Chemical Formula 4,

L is neutral or cationic Lewis acid, H is a hydrogen atom, Z is a Group 13 atom, A's may be identical to or different from each other, and are independently an aryl group having 6 to 20 carbon atoms, or an alkyl group having 1 to 20 carbon atoms, where one or more hydrogen atoms are unsubstituted or substituted with halogen, a hydrocarbon having a carbon number of 1 to 20, alkoxy or phenoxy.

Examples of the compound represented by the Chemical Formula 2 may include methylaluminoxane (MAO), ethylaluminoxane, isobutylaluminoxane, butylaluminoxane, and the like.

Examples of the alkyl metal compound represented by the Chemical Formula 3 may include trimethylaluminum, triethylaluminum, triisobutylaluminum, tripropylaluminum, tributylaluminum, dimethylchloroaluminum, dimethylisobutylaluminum, dimethylethylaluminum, diethylchloroaluminum, triisopropylaluminum, tri-s-butylaluminum, tri-cyclopentylaluminum, tripentylaluminum, triisopentylaluminum, trihexylaluminum, ethyldimethylaluminum, methyldiethylaluminum, triphenylaluminum, tri-p-tollylaluminum, dimethylaluminum methoxide, dimethylaluminum ethoxide, trimethylboron, triethylrobon, triisobutylboron, tripropylboron, tributylboron, and the like.

Examples of the compound represented by the Chemical Formula 4 may include triethylammoniumtetraphenylboron, tributylammoniumtetraphenylboron, trimethylammoniumtetraphenylboron, tripropylammoniumtetraphenylboron, trimethylammoniumtetra(p-tollyl)boron, tripropylammoniumtetra(p-tollyl)boron, triethylammoniumtetra(o,p-dimethylphenyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tollyl)aluminum, tripropylammoniumtetra(p-tollyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluoro phenylaluminum, N,N-diethylaniliniumtetraphenylaluminum, N,N-diethylaniliniumtetraphenylaluminum, N,N-diethylaniliniumtetrapentafluorophenylaluminum, diethylammoniumtetrapentafluorophenylaluminum, triphenylphosphoniumtetraphenylaluminum, trimethylphosphoniumtetraphenylaluminum, triphenylcarboniumtetraphenylboron, triphenylcarboniumtetraphenylaluminum, triphenylcarboniumtetra(p-trifluoromethylphenyl)boron, triphenylcarboniumtetrapentafluorophenylboron, dimethylanilinium tetrakis(pentafluorophenyl)borate, and the like.

The present invention also provides a method for preparing the catalyst composition.

As the method for preparing the catalyst composition according to the present invention, for example, the following methods may be used.

First, the method comprises the steps of contacting a dinuclear metallocene compound of the Chemical Formula 1 with a compound of the Chemical Formula 2 and/or a compound of the Chemical Formula 3 to obtain a mixture; and adding a compound of the Chemical Formula 4 to the mixture.

Second, the method comprises the step of contacting a dinuclear metallocene compound of the Chemical Formula 1 with a compound of the Chemical Formula 2 to prepare a catalyst composition.

Third, the method comprises the step of contacting a dinuclear metallocene compound of the Chemical Formula 1 with a compound of the Chemical Formula 4 to prepare a catalyst composition.

Among the preparation methods of a catalyst composition, in the case of the first method, the mole ratio of the dinuclear metallocene compound of the Chemical Formula 1 to the metal included in the compound of the Chemical Formula 2 and/or the compound of the Chemical Formula 3 may be preferably 1:2 to 1:5,000, more preferably, 1:5 to 1:1,000, most preferably 1:10 to 1:500. And, the mole ratio of the dinuclear metallocene compound of the Chemical Formula 1 to the metal included in the compound of the Chemical Formula 4 may be preferably 1:1 to 1:25, more preferably 1:1 to 1:10.

If the amount of the compound of the Chemical Formula 2 and the compound of the Chemical Formula 3 per 1 mole of the dinuclear metallocene compound of the Chemical Formula 1 is less than 2 moles, the amount of alkylating agent may be too small and thus alkylation of the metal compound may not be completely progressed. And, if the amount of the compound of the Chemical Formula 2 and the compound of the Chemical Formula 3 per 1 mole of the dinuclear metallocene compound of the Chemical Formula 1 is greater than 5,000 moles, although alkylation of the metal compound is achieved, activation of the alkylated metal compound may not be completed achieved due to side reactions between the excessive amount of remaining alkylating agent and the activator of the Chemical Formula 4. And, if the amount of the compound of the Chemical Formula 4 per 1 mole of the dinuclear metallocene compound of the Chemical Formula 1 is less than 1 mole, the amount of the activator may be relatively small, and thus, activation of the metal compound may not be completely achieved to decrease activity of the produced catalyst composition, and if the amount of the compound of the Chemical Formula 4 per 1 mole of the dinuclear metallocene compound of the Chemical Formula 1 is greater than 25 moles, although activation of the metal compound is completely achieved, due to excessive amount of remaining activator, unit cost of the catalyst composition may not be economical or purity of the produced polymer may decrease.

Among the preparation methods of a catalyst composition, in the case of the second method, the mole ratio of the dinuclear metallocene compound of the Chemical Formula 1 to the compound of the Chemical Formula 2 is preferably 1:10 to 1:10,000, more preferably 1:100 to 1:5,000, and most preferably 1:500 to 1:2,000. If the amount of the compound of the Chemical Formula 2 per 1 mole of the dinuclear metallocene compound of the Chemical Formula 1 is less than 10 moles, the amount of the activator may be relatively small, and thus, activation of the metal compound may not be completely achieved to decrease activity of the catalyst composition, and if the amount of the compound of the Chemical Formula 2 per 1 mole of the dinuclear metallocene compound of the Chemical Formula 1 is greater than 10,000 moles, due to the excessive amount of remaining activator, unit cost of the catalyst composition may not be economical or purity of the produced polymer may decrease.

Among the preparation methods of a catalyst composition, in the case of the third method, the mole ratio of the dinuclear metallocene compound of the Chemical Formula 1 to the compound of the Chemical Formula 4 is preferably 1:1 to 1:25, more preferably 1:1 to 1:10, and most preferably 1:2 to 1:5.

When preparing the catalyst composition, as a reaction solvent, hydrocarbon based solvents such as pentane, hexane, heptane and the like, or aromatic solvents such as benzene, toluene and the like may be used, but not limited thereto, and all the solvents used in the technical field may be used.

And, the dinuclear metallocene compounds of the Chemical Formula 1 and the cocatalysts may be supported in silica or alumina.

The present invention also provides a method for preparing polyolefin using the catalyst composition.

The method for preparing polyolefin according to the present invention comprises the step of polymerizing at least one kind of olefin monomers, in the presence of the catalyst composition.

The preparation method of polyolefin may be conducted by contacting the catalyst composition with monomers. According to the preparation method of polyolefin of the present invention, olefin homopolymer or olefin copolymer may be provided.

In the preparation method of polyolefin of the present invention, most preferable polymerization process using the catalyst composition is a solution process. If the catalyst composition is used together with an inorganic support such as silica, it can be applied for a slurry or gas phase process.

In the preparation method of polyolefin of the present invention, the catalyst composition may be dissolved or diluted in a C5-C12 aliphatic hydrocarbon solvent, for example, pentane, hexane, heptane, nonane, decane and isomers thereof, an aromatic hydrocarbon solvent such as toluene and benzene, or a hydrocarbon solvent substituted with a chlorine atom such as dichloromethane and chlorobenzene, and the like, which are suitable for olefin polymerization, and be injected. It is preferable that the solvent is be treated with a small amount of alkylaluminum, thereby removing a small amount of water or air and the like, which acts as a catalyst poison, and a cocatalyst may be additionally used.

Examples of olefin monomers that can be polymerized using the dinuclear metallocene compound and the cocatalyst may include ethylene, alpha-olefin, cyclic olefin and the like, and diene olefin monomers or triene olefin monomers and the like, which have two or more double bonds may also be polymerized. Specific examples of the monomers may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosens, norbornene, norbornadiene, ethylnorbornene, phenylnorbornene, vinylnorbornene, dicylcopentadiene, 1,4-butadiene, 1,5-pentadiene, 1,6-hexadiene, styrene, alpha-methylstyrene, divinylbenzene, 3-chloromethylstyrene, and the like, and two or more kinds thereof may be mixed and copolymerized. If the olefin polymer is a copolymer of ethylene and other comonomers, the comonomer constituting the copolymer may be preferably at least one selected from the group consisting of propylene, 1-butene, 1-hexene and 4-methyl-1-pentene, and 1-octene.

Particularly, in the preparation method of polyolefin according to the present invention, monomers having large steric hindrance such as ethylene and 1-octene may also be copolymerized using the catalyst composition, wherein by using a dinuclear metallocene compound, electronic and steric environment around a metal may be easily controlled, and ultimately, the structure and the properties and the like of the produced polyolefin may be controlled.

Hereinafter, a polymerization process of polyolefin will be exemplified, however, these are presented only to illustrate the invention, and are not intended to limit the scope of the invention thereto.

A reactor used in the preparation method of polyolefin according to the present invention may be preferably a continuously stirred tank reactor (CSTR) or a continuous flow reactor (PFR). It is preferable that two or more of the reactors are arranged in series or in a row. And, it is preferable that the preparation method further comprises a separator for continuously separating solvents and non-reacted monomers from a reaction mixture.

In case the preparation method of polyolefin according to the present invention is conducted by a continuous solution polymerization process, it may consist of a catalytic process, a polymerization process, a solvent separation process and a recovery process, which will be explained below in detail.

a) A Catalytic Process

The catalyst composition according to the present invention may be dissolved or diluted in a C5-C12 aliphatic or aromatic solvent unsubstituted or substituted with halogen, which is suitable for olefin polymerization, and be injected. For example, an aliphatic hydrocarbon solvent such as pentane, hexane, heptane, nonane, decane, and isomers thereof, an aromatic hydrocarbon solvent such as toluene, xylene and benzene, a hydrocarbon solvent substituted with a chlorine atom such as dichloromethane and chlorobenzene, and the like may be used. It is preferable that the solvent is treated with a small amount of alkylaluminum and the like, thereby removing a small amount of water or air and the like, which acts as a catalyst poison, and an excessive amount of a cocatalyst may be used.

b) A Polymerization Process

A polymerization process is progressed by introducing a catalyst composition comprising a dinuclear metallocene compound of the Chemical Formula 1 and a cocatalyst and at least one kind of olefin monomers in a reactor. In the case of solution and slurry polymerization, a solvent is introduced in the reactor. In the case of solution polymerization, a mixed solution of a solvent, a catalyst composition and monomers exist inside a reactor.

The mole ratio of monomers to solvent should be suitable for dissolving raw material before the reaction and polymer produced after the reaction. Specifically, the mole ratio of monomers to solvent may be 10:1 to 1:10,000, preferably 5:1 to 1:100, most preferably 1:1 to 1:20. If the mole ratio is less than 10:1, the amount of solvents may be too small, and thus, viscosity of fluid may increase to cause problems in terms of polymer transfer, and if the mole ratio is greater than 1:10,000, the amount of the solvent may be more than is necessary, thus increasing facilities and energy cost and the like due to purification and recycle of the solvent.

It is preferable that the solvent is introduced into the reactor at a temperature of −40° C. to 150° C. using a heater or a refrigerator, and thereby, a polymerization reaction begins with the monomers and the catalyst composition. If the temperature of the solvent is less than −40° C., although differs according to the reaction amount, in general, the temperature of the solvent is too low, and thus, reaction temperature may drop together, rendering it difficult to control the temperature, and if it is greater than 150° C., the temperature of the solvent is too high, thus rendering it difficult to remove reaction heat.

As a high capacity pump increases pressure above 50 bar to supply feed (solvent, monomers, catalyst composition, and the like), a feed mixture may be passed without additional pumping between the reactor arrangement, a pressure dropping device and a separator.

The internal temperature of the reactor, i.e., polymerization temperature suitable for the present invention is −15° C. to 300° C., preferably 50° C. to 200° C., most preferably 50° C. to 150° C. If the internal temperature is less than −15° C., productivity may decrease due to low reaction speed, and if it is greater than 300° C., due to side reactions, discoloration problem such as polymer carbonization and generation of impurities may be caused.

The internal pressure of the reactor suitable for the present invention is 1 bar to 300 bar, preferably 30 to 200 bar, most preferably 30 to 50 bar. If the internal pressure is less than 1 bar, productivity may decrease due to low reaction speed, and the solvent may be vaporized, and if it is greater than 300 bar, the cost of equipment such as device cost due to high pressure may increase.

It is preferable that the polymer produced in the reactor is maintained in the solvent at a concentration less than 20 wt %, and after a short residence time, is transferred to a first solvent separation process for solvent removal. The residence time of the produced polymer in the reactor may be 1 minute to 10 hours, preferably 3 minutes to 1 hour, most preferably 5 minutes to 30 minutes. If the residence time is less than 3 minutes, due to the short residence time, productivity may decrease and catalyst may be lost, thus increasing preparation cost, and if it is greater than 1 hour, due to reaction for more than optimum active period of a catalyst, a reactor may become large, thus increasing the cost of equipment.

c) A Solvent Separation Process

By changing the temperature and the pressure of the solution to remove the solvent existing together with the polymer coming out of the reactor, a solvent separation process is conducted. For example, the temperature of a polymer solution transferred from a reactor is raised to about 200° C. to about 230° C. through a heater, and then, the pressure is dropped while passing through a pressure dropping device, and non-reacted raw material and the solvent are vaporized in a first separator.

Wherein, the pressure inside the separator may be 1 to 30 bar, preferably 1 to 10 bar, most preferably 3 to 8 bar. The temperature inside the separator may be 150° C. to 250° C., preferably 170° C. to 230° C., most preferably 180° C. to 230° C.

If the pressure inside the separator is less than 1 bar, polymer content may increase, thus causing a problem in terms of transfer, and if it is greater than 30 bar, it may be difficult to separate the solvent used in the polymerization process. And, if the temperature inside the separator is less than 150° C., the viscosity of copolymer and a mixture thereof may increase, thus causing a problem in terms of transfer, and if it is greater than 250° C., degeneration may occur due to the high temperature, thus causing carbonization and the resulting discoloration of polymer.

The solvent vaporized in the separator may be recycled to a condensed reactor in overhead system. After passing through the first solvent separation process, a polymer solution concentrated to 65% may be obtained, which is transferred to a second separator by a transfer pump through a heater, and a separation process for the remaining solvent is conducted in a second separator. In order to prevent modification of polymer due to high temperature while passing through the heater, a heat stabilizer is introduced, and simultaneously, in order to inhibit the reaction of polymer due to the remaining activity of activated substance existing in the polymer solution, a reaction inhibitor is introduced into the heater together with the heat stabilizer. The remaining solvent in the polymer solution introduced into the second separator is finally removed completely by a vacuum pump, and after passing through a coolant and a cutter, granulated polymer may be obtained. The solvent vaporized in the second separation process and other non-reacted monomers may be sent to a recovery process, and purified and reused.

d) A Recovery Process

The organic solvent introduced together with raw material in the polymerization process may be recycled to the polymerization process together with non-reacted raw material in the first solvent separation process. However, it is preferable that the solvent recovered in the second solvent separation process is purified in a recovery process and reused, because the incorporation of a reaction inhibitor may cause pollution and moisture acting as a catalyst poison may be contained in the solvent in a large quantity due to steam supply in a vacuum pump.

The polyolefin prepared by the preparation method of the present invention may have melt index ($I_2$) of about 0.1 to about 2.5 g/10 min, preferably about 0.1 to about 2 g/10 min. And, the melting point (Tm) of the polyolefin may be about 20 to about 60° C., preferably about 40 to about 50° C.

Hereinafter, the actions and the effects of the invention will be explained in detail, with reference to specific examples. However, these examples are only presented to illustrate the invention, and the right scope of the invention is not determined thereby.

EXAMPLE

The organic reagents and solvents used in the following examples, unless specifically mentioned, were purchased from Aldrich Company, purified by a standard method and used. In all the synthesis steps, contact of air with moisture was blocked to increase reproducibility of the experiments.

Synthesis of Dinuclear Metallocene Compound

Preparation Example 1

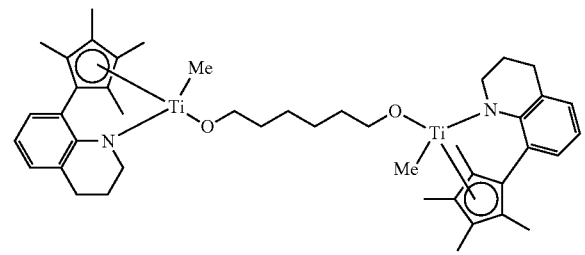

([(1,2,3,4-tetrahydroquinolin-8-yl)tetramethylcyclopentadienyl-eta5, kappa-N] titanium dimethyl) (1 g, 3.04 mmol) was dissolved in a methyl tertiary-butyl ether (40 mL) solvent. And then, it was slowly added dropwise to a solution of 1,6-hexanediol (180 mg, 1.52 mmol) dissolved in methyl tertiary-butyl ether (20 mL) at −20° C. The temperature of an orange solution was slowly raised and the solution was stirred at room temperature (25° C.) for 36 hours.

After removing the methyl tertiary-butyl ether solvent, 30 ml of n-hexane was added to filter, and then, a desired compound in the form of orange solid was obtained (1.0 g, 95% or more yield).

$^1$H NMR (CDCl$_3$): δ 1.26 (s, 3H, Ti—CH$_3$), 1.85 (m, 6H, Cp-CH$_3$), 1.00~2.00 (br, 6H, diol aliphatic (CH$_2$)$_2$, quinoline-CH$_2$), 2.13 (m, 6H, Cp-CH$_3$ and CH$_3$), 2.61 (m, 2H, quinoline-CH$_2$), 3.77 (br, 2H, OCH$_2$), 4.16 (m, 2H, quinoline-NCH$_2$), 6.64 (m, 1H, aromatic), 6.91 (m, 2H, aromatic) ppm Preparation Example 2

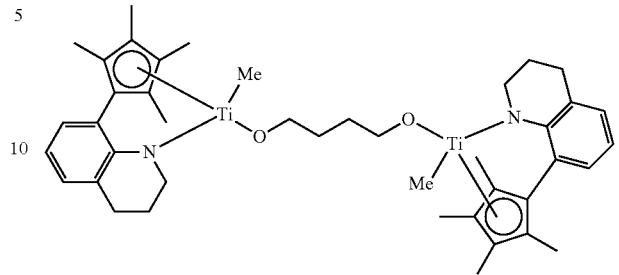

([(1,2,3,4-tetrahydroquinolin-8-yl)tetramethylcyclopentadienyl-eta5, kappa-N] titanium dimethyl) (1 g, 3.04 mmol) was dissolved in a methyl tertiary-butyl ether (40 mL) solvent. And then, it was slowly added dropwise to a solution of 1,4-butanediol (140 mg, 1.55 mmol) dissolved in methyl tertiary-butyl ether (20 mL) at −20° C. The temperature of an orange solution was slowly raised and the solution was stirred at room temperature (25° C.) for 36 hours.

After removing the methyl tertiary-butyl ether solvent, 30 mL of n-hexane was added to filter, and a desired compound in the form of orange solid was obtained (1.0 g, 95% or more yield).

$^1$H NMR (CDCl$_3$): δ 1.26 (s, 3H, Ti—CH$_3$), 1.85 (m, 6H, Cp-CH$_3$), 1.00~2.00 (br, 4H, diol aliphatic (CH$_2$), quinoline-CH$_2$), 2.13 (m, 6H, Cp-CH$_3$ and CH$_3$), 2.62 (m, 2H, quinoline-CH$_2$), 3.79 (br, 2H, OCH$_2$), 4.17 (m, 2H, quinoline-NCH$_2$), 6.64 (m, 1H, aromatic), 6.89 (m, 2H, aromatic) ppm Preparation Example 3

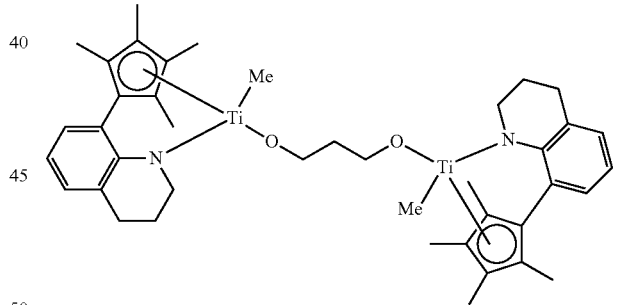

([(1,2,3,4-tetrahydroquinolin-8-yl)tetramethylcyclopentadienyl-eta5, kappa-N] titanium dimethyl) (1 g, 3.04 mmol) was dissolved in a methyl tertiary-butyl ether (40 mL) solvent. And then, it was slowly added dropwise to a solution of 1,3-propanediol (115 mg, 1.51 mmol) dissolved in methyl tertiary-butyl ether (20 mL) at −20° C. The temperature of an orange solution was slowly raised and the solution was stirred at room temperature (25° C.) for 36 hours.

After removing the methyl tertiary-butyl ether solvent, 30 mL of n-hexane was added to filter, and a desired compound in the form of orange solid was obtained (1.0 g, 95% or more yield).

$^1$H NMR (CDCl$_3$): δ 1.19 (s, 3H, Ti—CH$_3$), 1.84 (m, 6H, Cp-CH$_3$), 1.00~2.00 (br, 4H, diol aliphatic (CH$_2$), quinoline-CH$_2$), 2.01 (m, 6H, Cp-CH$_3$ and CH$_3$), 2.61 (m, 2H, quinoline-CH$_2$), 3.97 (br, 2H, OCH$_2$), 4.24 (m, 2H, quinoline-NCH$_2$), 6.71 (m, 1H, aromatic), 6.90 (m, 2H, aromatic) ppm Comparative Preparation Example 1

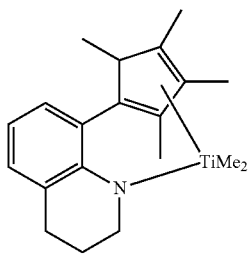

A compound of the above structural formula was prepared according to the method described in Example 7 of US 20070025158A1.

Preparation of Olefin Copolymer Using a Catalyst Composition

Example 1

Into a 2 L autoclave reactor, a hexane solvent (1.0 L) and 6.4 mmol of 1-octene were added, and then, the temperature of the reactor was preheated to 120° C. To a 25 mL catalyst storage tank, the compound of Preparation Example 1 (0.5 μmol) treated with triisobutylaluminum (10 μmol) and a dimethylanilinium tetrakis(pentafluorophenyl)borate cocatalyst (10 μmol) were sequentially added and filled (the mole ratio of Al:Ti is 10). Subsequently, ethylene pressure (35 bar) was added into the autoclave reactor, and a catalyst composition was injected into the reactor using high pressure argon gas to progress copolymerization for 10 minutes. Next, the remaining ethylene gas was taken out and the polymer solution was added to an excessive amount of ethanol to induce precipitation. The precipitated polymer was washed with ethanol and acetone each two or three times, and dried in a 80° C. vacuum oven for more than 12 hours, and then, the properties were measured.

Example 2

Into a 2 L autoclave continuous process reactor, a hexane solvent (4.53 kg/h) and 1-octene (0.8 kg/h) were filled, and then, the temperature of the upper part of the reactor was preheated to 150° C. Triisobutylaluminium (0.05 mmol/min), the compound of Preparation Example 1 (0.5 μmol/min), and a dimethylanilinium tetrakis(pentafluorophenyl) borate cocatalyst (1.5 μmol/min) were simultaneously introduced into the reactor.

Subsequently, ethylene (0.84 kg/h) was introduced into the autoclave reactor, and the same temperature was maintained for more than 30 minutes and then copolymerization was progressed for 8 minutes in a continuous process to obtain copolymer. Next, the remaining ethylene gas was taken out, and the polymer solution was dried in a 80° C. vacuum oven for more than 12 hours, and then, the properties were measured.

Example 3

Into a 2 L autoclave continuous process reactor, a hexane solvent (5.4 kg/h) and 1-butene (0.8 kg/h) were filled, and then, the temperature of the upper part of the reactor was preheated to 150° C. Triisobutylaluminium (0.05 mmol/min), the compound of Preparation Example 1 (0.5 μmol/min), and a dimethylanilinium tetrakis(pentafluorophenyl) borate cocatalyst (1.5 μmol/min) were simultaneously introduced into the reactor.

Subsequently, ethylene (0.83 kg/h) was introduced into the autoclave reactor, and the same temperature was maintained for more than 30 minutes and then copolymerization was progressed for 8 hours in a continuous process to obtain copolymer. Next, the remaining ethylene gas was taken out, and the polymer solution was dried in a 80° C. vacuum oven for more than 12 hours, and then, the properties were measured.

Example 4

Ethylene-1-octene copolymer was prepared by the same method as Example 1, except that 0.5 μmol of the compound of Preparation Example 2 was introduced instead of the compound of Preparation Example 1 in Example 1.

Example 5

Ethylene-1-octene copolymer was prepared by the same method as Example 2, except that the compound of Preparation Example 2 (0.5 μmol/min) was introduced instead of the compound of Preparation Example 1 in Example 2.

Example 6

Ethylene-1-butene copolymer was prepared by the same method as Experimental Example 3, except that the compound of Preparation Example 2 (0.5 μmol/min) was introduced instead of the compound of Preparation Example 1 in Example 3.

Example 7

Ethylene-1-octene copolymer was prepared by the same method as Example 1, except that 0.5 μmol of the compound of Preparation Example 3 was introduced instead of the compound of Preparation Example 1 in Example 1.

Example 8

Ethylene-1-octene copolymer was prepared by the same method as Example 2, except that the compound of Preparation Example 3 (0.5 μmol/min) was introduced instead of the compound of Preparation Example 1 in Example 2.

Example 9

Ethylene-1-butene copolymer was prepared by the same method as Example 3, except that the compound of Preparation Example 3 (0.5 μmol/min) was introduced instead of the compound of Preparation Example 1 in Example 3.

Comparative Example 1

Ethylene-1-octene copolymer was prepared by the same method as Example 1, except that 1.0 μmol of the compound of Comparative Preparation Example 1 was introduced instead of the compound of Preparation Example 1 in Example 1.

Comparative Example 2

Ethylene-1-octene copolymer was prepared by the same method as Example 2, except that the compound of Comparative Preparation Example 1 (1.0 µmol/min) was introduced instead of the compound of Preparation Example 1 in Example 2.

Comparative Example 3

Ethylene-1-butene copolymer was prepared by the same method as Example 3, except that the compound of Comparative Preparation Example 1 (1.0 µmol/min) was introduced instead of the compound of Preparation Example 1 in Example 3.

The catalytic activities and the properties of ethylene-1-octene copolymer in Example 1 and Comparative Example 1 are shown in the Table 1 below.

TABLE 1

| Catalyst compound | Example 1 Preparation Example 1 | Comparative Example 1 Comparative Preparation Example 1 |
| --- | --- | --- |
| Reaction temperature(unit: ° C.) | 120 | 120 |
| Catalyst compound(unit: µmol) | 0.5 | 1.0 |
| Al(cocatalyst):Ti(catalyst compound) mole ratio | 10 | 10 |
| 1-octene introduction amount (unit: mmol) | 6.4 | 6.4 |
| Activity (unit: kgPOE/mmol hr) | 76 | 75 |
| Melt index $I_2$ (unit: g/10 min) | 1.12 | 2.56 |
| Melt index $I_{10}$ (unit: g/10 min) | 11.2 | 29.9 |

And, the catalytic activities and the properties of ethylene-1-octene copolymer in Example 2 and Comparative Example 2 are shown in the Table 2 below.

TABLE 2

| Catalyst compound | Example 2 Preparation Example 1 | Comparative Example 2 Comparative Preparation Example 1 |
| --- | --- | --- |
| Reaction temperature(unit: ° C.) | 150 | 150 |
| Catalyst compound(unit: µmol/min) | 0.5 | 1.0 |
| Al(cocatalyst):Ti(catalyst compound) mole ratio | 50 | 50 |
| 1-octene introduction amount (unit: mmol) | 760 | 760 |
| Yield (unit: g/h) | 1024.2 | 966.0 |
| Activity (unit: kgPE/mmol Ti hr) | 48.8 | 32.2 |
| Melt index $I_2$ (unit: g/10 min) | 4.21 | 3.34 |
| Density (unit: g/ml) | 0.869 | 0.868 |
| Tm (unit: ° C.) | 50.7 | 51.5 |

Referring to Tables 1 and 2, since the dinuclear metallocene compound of the present invention has a structure wherein single metallocene compounds are connected by a diether chain, unnecessary interactions between the metals may be minimized to afford stable catalytic activity, and thus, it has high activity and can prepare polyolefin having high molecular weight compared to mononuclear metallocene catalyst.

What is claimed is:
1. A catalyst composition comprising
   a dinuclear metallocene compound represented by Chemical Formula 1; and
   at least one cocatalyst compound selected from the group consisting of a compound represented by Chemical Formula 2, a compound represented by Chemical Formula 3, and a compound represented by Chemical Formula 4:

[Chemical Formula 1]

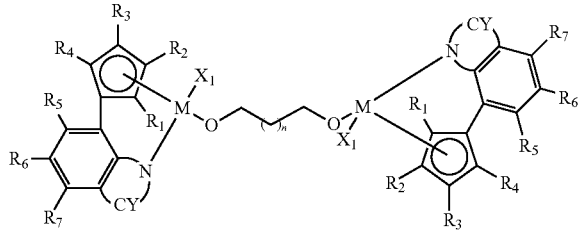

in Chemical Formula 1,
R1 to R4 are independently hydrogen; a halogen radical; an alkyl radical having a carbon number of 1 to 20; an alkenyl radical having a carbon number of 2 to 20; a silyl radical; an aryl radical having a carbon number of 6 to 20; an alkylaryl radical having a carbon number of 7 to 20; or an arylalkyl radical having a carbon number of 7 to 20; and two or more adjacent radicals of R1 to R4 are optionally linked to each other to form an aliphatic ring, or an aromatic ring;

R5 to R7 are independently hydrogen; a halogen radical; an alkyl radical having a carbon number of 1 to 20; an alkenyl radical having a carbon number of 2 to 20; an aryl radical having a carbon number of 6 to 20; an alkylaryl radical having a carbon number of 7 to 20; an arylalkyl radical having a carbon number of 7 to 20; an alkoxy radical having a carbon number of 1 to 20; an aryloxy radical having a carbon number of 6 to 20; or an amido radical; and two or more adjacent radicals of R5 to R7 are optionally linked to each other to form an aliphatic ring, or an aromatic ring;

CY is an aliphatic or aromatic ring containing nitrogen, and may be unsubstituted or substituted with halogen, an alkyl or aryl radical having a carbon number of 1 to 20, and when CY has multiple substituents, two or more substituents are optionally linked to each other to form an aliphatic or aromatic ring;

M is Group 4 transition metal;

X1 is a halogen radical; an alkyl radical having a carbon number of 1 to 20; an alkenyl radical having a carbon number of 2 to 20; an aryl radical having a carbon number of 6 to 20; an alkylaryl radical having a carbon number of 7 to 20; an arylalkyl radical having a carbon number of 7 to 20; an alkylamido radical having a carbon number of 1 to 20; an arylamido radical having a carbon number of 6 to 20; or an alkylidene radical having a carbon number of 1 to 20; and n is an integer of 0 to 10, —[Al(R$_8$)—O]$_c$—     [Chemical Formula 2]

in Chemical Formula 2, R$_8$ is a halogen radical, a hydrocarbyl radical having a carbon number of 1 to 20, or a hydrocarbyl radical having a carbon number of 1 to 20 substituted with halogen, and c is an integer equal to or greater than 2, D(R$_9$)$_3$ [Chemical Formula 3]

in Chemical Formula 3,

D is aluminum or boron, R$_9$ is hydrocarbyl having a carbon number of 1 to 20 or hydrocarbyl having a carbon number of 1 to 20 substituted with halogen,

[L-H]$^+$[ZA$_4$]$^-$ or [L]$^+$[ZA$_4$]$^-$ [Chemical Formula 4]

in Chemical Formula 4,

L is neutral or cationic Lewis acid, H is a hydrogen atom, Z is a Group 13 atom, A's are independently an aryl group having 6 to 20 carbon atoms, or an alkyl group having 1 to 20 carbon atoms, where one or more hydrogen atoms are unsubstituted or substituted with halogen, a hydrocarbon having a carbon number of 1 to 20, alkoxy or phenoxy.

2. The catalyst composition according to claim 1, wherein in Chemical Formula 1, R1 to R7 are independently hydrogen, an alkyl group having a carbon number of 1 to 20, or an aryl group having a carbon number of 6 to 20, and CY is a 5-membered or 6-membered aliphatic or aromatic ring containing nitrogen, unsubstituted or substituted with an alkyl group having a carbon number of 1 to 20, M is titanium(Ti), zirconium(Zr), or hafnium(Hf), and X1 is halogen or an alkyl group having a carbon number of 1 to 20.

3. The catalyst composition according to claim 1, wherein the compound of Chemical Formula 1 is represented by the following structures:

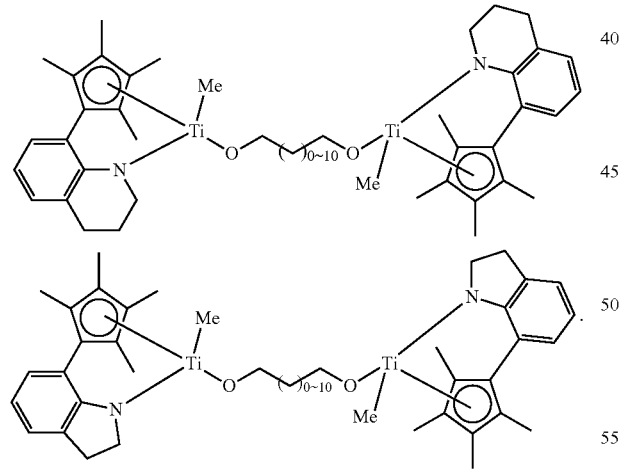

4. A method for preparing a catalyst composition comprising the steps of:

contacting a dinuclear metallocene compound represented by Chemical Formula 1 with a compound represented by Chemical Formula 2 and/or a compound represented by Chemical Formula 3 to obtain a mixture; and adding a compound represented by Chemical Formula 4 to the mixture:

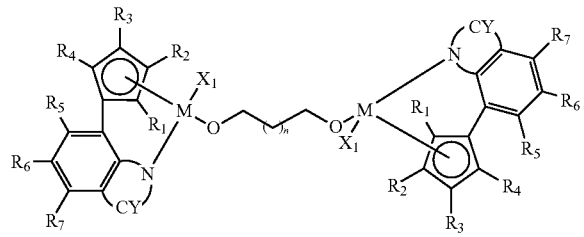

[Chemical Formula 1]

in Chemical Formula 1,

R1 to R4 are independently hydrogen; a halogen radical; an alkyl radical having a carbon number of 1 to 20; an alkenyl radical having a carbon number of 2 to 20; a silyl radical; an aryl radical having a carbon number of 6 to 20; an alkylaryl radical having a carbon number of 7 to 20; or an arylalkyl radical having a carbon number of 7 to 20; and two or more adjacent radicals of R1 to R4 are optionally linked to each other to form an aliphatic ring, or an aromatic ring;

R5 to R7 independently hydrogen; a halogen radical; an alkyl radical having a carbon number of 1 to 20; an alkenyl radical having a carbon number of 2 to 20; an aryl radical having a carbon number of 6 to 20; an alkylaryl radical having a carbon number of 7 to 20; an arylalkyl radical having a carbon number of 7 to 20; an alkoxy radical having a carbon number of 1 to 20; an aryloxy radical having a carbon number of 6 to 20; or an amido radical; and two or more adjacent radicals of R5 to R7 are optionally linked to each other to form an aliphatic ring, or an aromatic ring;

CY is an aliphatic or aromatic ring containing nitrogen, and may be unsubstituted or substituted with halogen, an alkyl or aryl radical having a carbon number of 1 to 20, and when CY has multiple substituents, two or more substituents are optionally linked to each other to form an aliphatic or aromatic ring;

M is Group 4 transition metal;

X1 is a halogen radical; an alkyl radical having a carbon number of 1 to 20; an alkenyl radical having a carbon number of 2 to 20; an aryl radical having a carbon number of 6 to 20; an alkylaryl radical having a carbon number of 7 to 20; an arylalkyl radical having a carbon number of 7 to 20; an alkylamido radical having a carbon number of 1 to 20; an arylamido radical having a carbon number of 6 to 20; or an alkylidene radical having a carbon number of 1 to 20; and n is an integer of 0 to 10, —[Al(R$_8$)—O]$_c$— [Chemical Formula 2]

in Chemical Formula 2, R$_8$ is a halogen radical, a hydrocarbyl radical having a carbon number of 1 to 20, or a hydrocarbyl radical having a carbon number of 1 to 20, substituted with halogen, and c is an integer equal to or greater than 2, D(R$_9$)$_3$ [Chemical Formula 3]

in Chemical Formula 3,

D is aluminum or boron, R$_9$ is hydrocarbyl having a carbon number of 1 to 20 or hydrocarbyl having a carbon number of 1 to 20 substituted with halogen,

[L-H]$^+$[ZA$_4$]$^-$ or [L]$^+$[ZA$_4$]$^-$ [Chemical Formula 4]

in Chemical Formula 4,

L is neutral or cationic Lewis acid, H is a hydrogen atom, Z is a Group 13 atom, A's are independently an aryl group having 6 to 20 carbon atoms, or an alkyl group having 1 to 20 carbon atoms, where one or more hydrogen atoms are unsubstituted or substituted with halogen, a hydrocarbon having a carbon number of 1 to 20, alkoxy or phenoxy.

5. A method for preparing a catalyst composition according to claim 4, wherein a mole ratio of the dinuclear metallocene compound represented by Chemical Formula 1 to the compound represented by Chemical Formula 3 is 1:2 to 1:5,000, and a mole ratio of the dinuclear metallocene compound represented by Chemical Formula 1 to the compound represented by Chemical Formula 4 is 1:1 to 1:25.

6. A method for preparing polyolefin, comprising the step of polymerizing at least one kind of olefin monomers, in the presence of the catalyst composition according to claim 1.

7. The method for preparing polyolefin according to claim 6, wherein the polymerization of olefin monomers is conducted at a temperature of −15 to 300° C. and a pressure of 1 to 300 bar.

8. The method for preparing polyolefin according to claim 6, wherein the olefin monomer is at least one selected from the group consisting of 1-butene, 1-peneten, 1-hexene, 4-methyl-1-pentene, 1-octene, 1-decene, 1-dodecene, 1-tetradecene, 1-hexadecene, 1-octadecene, 1-eicosene, and a mixture thereof.

9. The method for preparing polyolefin according to claim 6, wherein the polyolefin has melt index($I_2$) of 0.1 to 2.5 g/10min.

* * * * *